US012638078B2

(12) United States Patent (10) Patent No.: US 12,638,078 B2
Terai (45) Date of Patent: May 26, 2026

(54) VEHICLE

(71) Applicant: SUBARU CORPORATION, Tokyo (JP)

(72) Inventor: Koichiro Terai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/187,192

(22) Filed: Apr. 23, 2025

(65) Prior Publication Data

US 2025/0354604 A1 Nov. 20, 2025

(30) Foreign Application Priority Data

May 15, 2024 (JP) .................................. 2024-079789

(51) Int. Cl.
*F16H 59/10* (2006.01)
(52) U.S. Cl.
CPC .................................. *F16H 59/105* (2013.01)
(58) Field of Classification Search
CPC .................................................... F16H 59/105
USPC ....................................................... 74/473.12
See application file for complete search history.

(56) References Cited

U.S. PATENT DOCUMENTS

2023/0264695 A1* 8/2023 Terai ...................... F16H 61/02
701/54
2024/0159311 A1* 5/2024 Ozawa .................. F16H 59/105

FOREIGN PATENT DOCUMENTS

JP 2010090925 A * 4/2010
JP 2016060378 A * 4/2016

* cited by examiner

*Primary Examiner* — T. Scott Fix
(74) *Attorney, Agent, or Firm* — TROUTMAN PEPPER LOCKE LLP

(57) ABSTRACT

A vehicle includes a range input device and a shift by wire control device. The range input device accepts an operation of a gear shift lever by a driver. The shift by wire control device switches a transmission range including first and second ranges in response to the operation. The range input device has first and second range areas corresponding to the first and second ranges, respectively. When operated, the gear shift lever passes through the second range area to reach the first range area. The shift by wire control device measures a residence time at the second range area, switches the transmission range to the second range when the residence time is at least a switching time, and corrects the switching time based on the residence time when the gear shift lever is moved to the first range area after the transmission range is switched to the second range.

9 Claims, 6 Drawing Sheets

Figure 1:
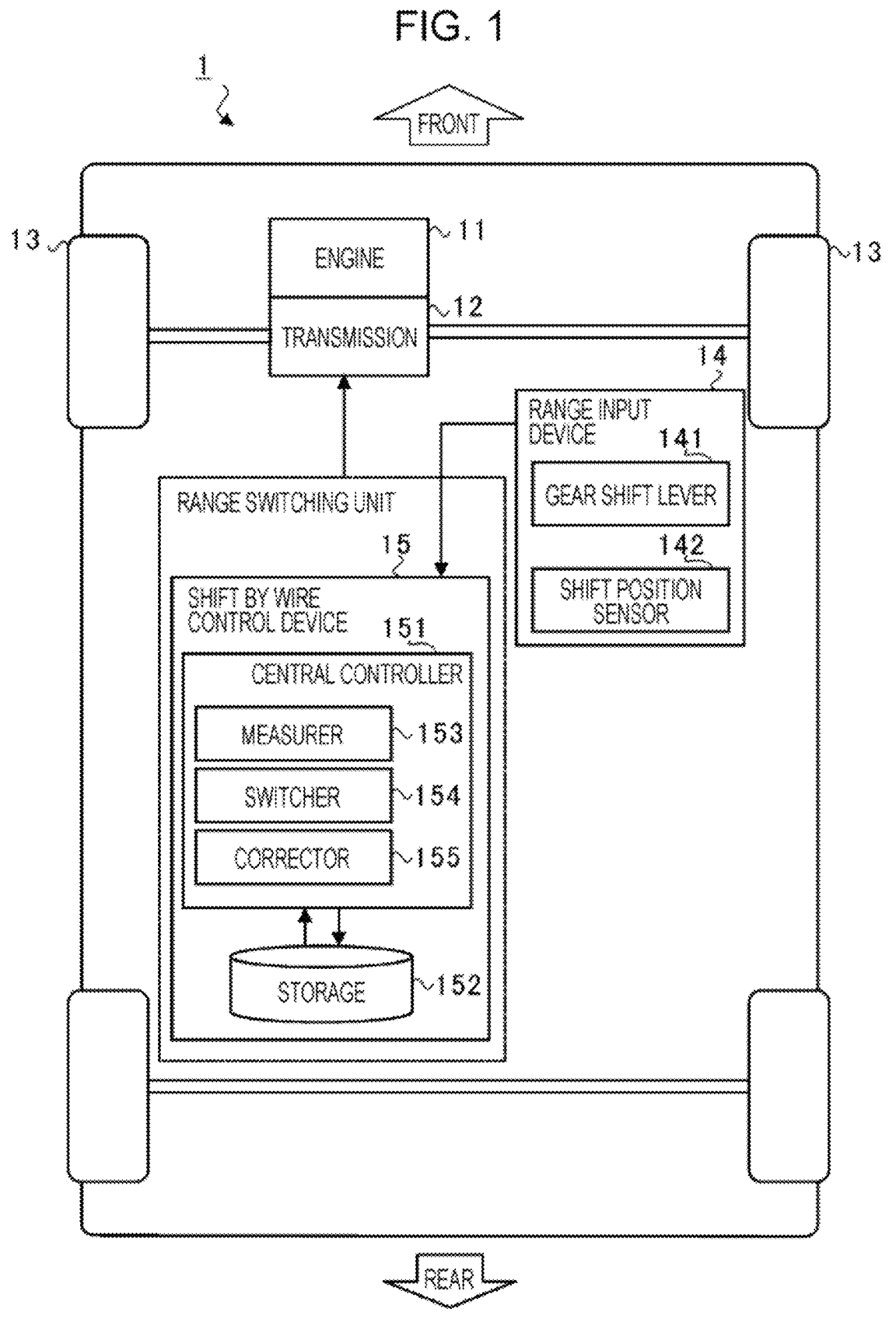

FRONT

13

13

ENGINE 11

TRANSMISSION 12

14

RANGE INPUT DEVICE

141

GEAR SHIFT LEVER

142

SHIFT POSITION SENSOR

RANGE SWITCHING UNIT

15

SHIFT BY WIRE CONTROL DEVICE

151

CENTRAL CONTROLLER

MEASURER 153

SWITCHER 154

CORRECTOR 155

STORAGE 152

REAR

FIG. 5

| | TIME (ms) | SWITCH TO N RANGE |
|---|---|---|
| RESIDENCE TIME Tx1 | 210ms | YES |
| RESIDENCE TIME Tx2 | 150ms | NO |
| RESIDENCE TIME Tx3 | 170ms | NO |
| RESIDENCE TIME Tx4 | 320ms | YES |
| RESIDENCE TIME Tx5 | 220ms | YES |

( SWITCHING TIME Ts＝200ms、N＝3)

VEHICLE

CROSS-REFERENCE TO RELATED APPLICATIONS

The present application claims priority from Japanese Patent Application No. 2024-079789 filed on May 15, 2024, the entire contents of which are hereby incorporated by reference.

BACKGROUND

The disclosure relates to a vehicle equipped with a shift by wire automatic transmission.

In a shift by wire automotive automatic transmission, a solenoid or other actuator is used to switch transmission ranges (drive range (D range), reverse range (R range), neutral range (N range), and parking range (P range)) automatically in response to shift operations by the driver.

Shift operations by the driver are performed by moving a gear shift lever to one of multiple range positions that correspond to the respective transmission ranges, and holding the moved gear shift lever at the range position. For each range position, a recognition time for recognizing that the gear shift lever has been moved is set, and if the moved gear shift lever is held at the range position for the recognition time or longer, the automotive automatic transmission switches to the transmission range corresponding to the range position (for example, see Japanese Unexamined Patent Application Publication No. 2010-090925). In some cases, the range positions are arranged so that when the gear shift lever is moved to a D range position that corresponds to the D range or to an R range position that corresponds to the R range, the gear shift lever passes through an N range position corresponding to the N range.

SUMMARY

An aspect of the disclosure provides a vehicle including a range input device and a shift by wire control device. The range input device is configured to accept an operation of a gear shift lever by a driver who drives a vehicle. The shift by wire control device is configured to switch a transmission range of a transmission in response to the operation of the gear shift lever. The transmission range includes a first range and a second range. The range input device has a first range area corresponding to the first range and a second range area corresponding to the second range. The range input device is configured to accept an operation by which the gear shift lever is moved to the first range area or an operation by which the gear shift lever is moved to the second range area. The range input device is structured such that the gear shift lever passes through the second range area when the gear shift lever is operated to the first range area. The shift by wire control device is configured to measure a residence time during which the gear shift lever is resident at the second range area. The shift by wire control device is configured to switch the transmission range to the second range if the residence time is equal to or greater than a switching time with which switching to the second range is determined. The shift by wire control device is configured to, when the gear shift lever is moved to the first range area after the transmission range is switched to the second range, correct the switching time based on the residence time until the gear shift lever is moved to the first range area.

An aspect of the disclosure provides a vehicle including a range input device and circuitry. The range input device is configured to accept an operation of a gear shift lever by a driver who drives a vehicle. The circuitry is configured to switch a transmission range of a transmission in response to the operation of the gear shift lever. The transmission range includes a first range and a second range. The range input device has a first range area corresponding to the first range and a second range area corresponding to the second range. The range input device is configured to accept an operation by which the gear shift lever is moved to the first range area or an operation by which the gear shift lever is moved to the second range area. The range input device is structured such that the gear shift lever passes through the second range area when the gear shift lever is operated to the first range area. The circuitry is configured to measure a residence time during which the gear shift lever is resident at the second range area. The circuitry is configured to switch the transmission range to the second range if the residence time is equal to or greater than a switching time with which switching to the second range is determined. The circuitry is configured, when the gear shift lever is moved to the first range area after the transmission range is switched to the second range, correct the switching time based on the residence time until the gear shift lever is moved to the first range area.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 1 is a schematic diagram illustrating a general configuration of a vehicle;

FIG. 5 is an explanatory diagram for explaining a process for correcting switching time in a vehicle.

DETAILED DESCRIPTION

Figure 2:
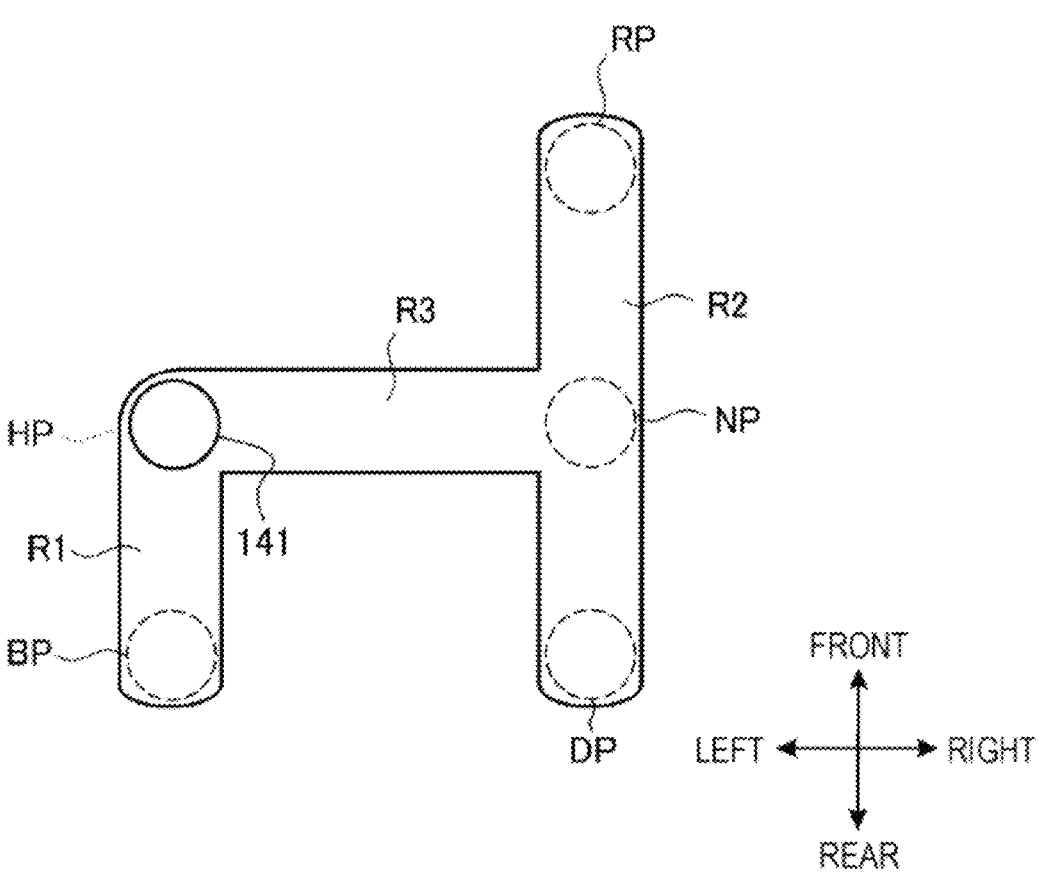
FIG. 2 is a schematic diagram illustrating an example of range positions of a range input device illustrated in FIG. 1.

In the case of the range positions described above, a driver who tends to perform shift operations slowly may stay in the N range position for the recognition time or longer when moving the gear shift lever to the D range position or the R range position while passing through the N range position, causing the automotive automatic transmission to once switch to the N range before switching to the D range or the R range. As a result, it may take time to switch to the D range or the R range, imparting discomfort to the driver.

Accordingly, it is desirable to provide a vehicle capable of providing shift operations that feel comfortable to the driver.

Hereinafter, an embodiment of the disclosure will be described in detail with reference to the attached drawings. The specific dimensions, materials, numerical values, and the like indicated in the embodiment are merely illustrative examples for facilitating comprehension of the disclosure, and do not define the disclosure unless otherwise indicated. Also, the relative sizes of component members illustrated in the drawings are not necessarily accurate representations of the size relationships between the actual component members. Note that, in this specification and the drawings, elements that have substantially the same function and configuration are denoted with the same reference signs and duplicate description of such elements is omitted. Moreover, elements not directly related to the disclosure are omitted from illustration.

Configuration of Vehicle

FIG. 1 is a schematic diagram illustrating a general configuration of a vehicle 1 according to the present embodiment. The vehicle 1 is assumed to be an engine-powered automobile with an engine as a drive source. Note that the vehicle 1 may be an electric automobile with a motor as a drive source, or may be a hybrid automobile with an engine and a motor as drive sources.

As illustrated in FIG. 1, the vehicle 1 is provided with an engine 11, a transmission 12, drive wheels 13, a range input device 14, and a shift by wire control device 15.

The engine 11 outputs motive power for driving the drive wheels 13. The output shaft of the engine 11 is coupled to the transmission 12. The motive power outputted from the engine 11 is transmitted to the transmission 12.

The transmission 12 has multiple transmission ranges. The output shaft of the transmission 12 is coupled to a differential (not illustrated). The motive power transmitted to the transmission 12 is transmitted by the transmission 12 to the differential as motive power in accordance with each transmission range, and is distributed to the pair of left and right drive wheels 13 by the differential. For example, a drive range (D range), a reverse range (R range), a neutral range (N range), a brake range (B range), and a parking range (P range) are provided as the transmission ranges of the transmission 12.

Note that the drive wheels 13 may be front wheels or rear wheels. The motive power outputted from the engine 11 may be transmitted to both front wheels and rear wheels. In that case, the output shaft of the transmission 12 is coupled to a front differential that distributes motive power to a pair of left and right front wheels, and to a rear differential that distributes motive power to a pair of left and right rear wheels.

The range input device 14 includes a gear shift lever 141 and a shift position sensor 142.

The gear shift lever 141 accepts shift operations by the driver who switches the transmission range of the transmission 12. For example, the range input device 14 has range positions that correspond to the respective transmission ranges in the transmission 12. The driver operates the gear shift lever 141 to a range position that corresponds to a desired transmission range. Note that the gear shift lever 141 is what is called a momentary gear shift lever, which has a self-return mechanism to return to a designated home position automatically after the driver finishes operating the gear shift lever 141.

The shift position sensor 142 detects the position of the gear shift lever 141 and outputs the result of the detection to the shift by wire control device 15. The type of the shift position sensor 142 is not particularly limited. For example, the shift position sensor 142 may detect the position of the gear shift lever 141 based on a voltage value that varies in correspondence with movement of the gear shift lever 141, or detect the position of the gear shift lever 141 based on a magnetic force that varies in correspondence with movement of the gear shift lever 141.

FIG. 2 is a schematic diagram illustrating an example of the range positions of the range input device 14. In FIG. 2, as indicated by the arrows, the direction of travel when the vehicle 1 moves forward is referred to as the forward direction, the direction of travel when the vehicle 1 moves in reverse is referred to as the rear direction, the direction on the right side, when the vehicle 1 moves forward, of the direction of travel is referred to as the right direction, and the direction on the left side, when the vehicle 1 moves forward, of the direction of travel is referred to as the left direction.

In the example illustrated in FIG. 2, a drive position DP, a reverse position RP, a neutral position NP, a brake position BP, and the home position HP described above are provided as the range positions. The drive position DP, the reverse position RP, the neutral position NP, and the brake position BP correspond to the drive range, the reverse range, the neutral range, and the brake range, respectively.

In the example illustrated in FIG. 2, the brake position BP is located behind the home position HP, and the neutral position NP is located to the right of the home position HP. The reverse position RP is located in front of the neutral position NP, and the drive position DP is located behind the neutral position NP. The home position HP and the brake position BP are connected by a route R1. The reverse position RP, the neutral position NP, and the drive position DP are connected by a route R2. The home position HP and the neutral position NP are connected by a route R3.

The gear shift lever 141 is operated along the routes R1, R2, and R3, and returns to the home position HP when the driver ends operation. Consequently, the range input device 14 is structured such that when the gear shift lever 141 is operated to the drive position DP or the reverse position RP, the gear shift lever 141 passes through the neutral position NP. In other words, the gear shift lever 141 is operated to the neutral position NP, and then is operated to the drive position DP or the reverse position RP.

Additionally, although described in detail later, if the gear shift lever 141 is moved to any range position and held there for at least a switching time corresponding to the range position, the shift by wire control device 15 switches the transmission to the transmission range corresponding to the range position. For example, suppose that a driver who tends to operate the gear shift lever 141 slowly attempts to switch the transmission range to the drive range or the reverse range. In this case, when the gear shift lever 141 passes through the neutral position NP, the residence time at the neutral position NP may be equal to or greater than the switching time for the neutral position NP, and the transmission range may be unintentionally switched to the neutral range. As a result, it may take time to switch the transmission range to the drive range or the reverse range, imparting discomfort to the driver.

Accordingly, in the vehicle 1 according to the present embodiment, a configuration is adopted to correct the switching time for the neutral position NP in accordance with the speed of operation of the gear shift lever 141 by the driver. This can prevent the transmission range from once being switched to the neutral range when the transmission range is intended to be switched to the drive range or the reverse range.

The shift by wire control device 15 forms a range switching unit that has functions pertaining to the switching of the transmission ranges of the transmission 12. The range switching unit is of the system referred to as shift by wire, in which the transmission range is not switched by a linkage mechanism mechanically coupled to the gear shift lever 141, but instead the transmission range is switched by an electrical signal. The range switching unit includes, in addition to the shift by wire control device 15, a manual valve (not illustrated) that selectively supplies hydraulic pressure to a drive clutch and a reverse clutch, a parking lock mechanism (not illustrated) that mechanically locks the output shaft of the transmission 12, and an electric actuator (not illustrated) that drives the manual valve and the parking lock mechanism by using a motor, a solenoid, and/or the like.

The shift by wire control device 15 controls the driving of the actuator. As illustrated in FIG. 1, the shift by wire control device 15 is provided with a central controller 151 and storage 152. The central controller 151 is formed from semiconductor integrated circuits, which may include a central processing unit (CPU), ROM in which a program and/or the like is stored, and RAM to be used as a work area. The central controller 151 controls the shift by wire control device 15 as a whole. The central controller 151 also functions as a measurer 153, a switcher 154, and a corrector 155 indicated below. The storage 152 is formed from RAM, flash memory, an HDD, and/or the like, and stores various information for processing by the central controller 151.

When the gear shift lever 141 is operated to any range position, the measurer 153 measures the residence time during which the gear shift lever 141 is resident at the range position. For example, when the gear shift lever 141 is operated to one from among the drive position DP, the reverse position RP, the neutral position NP, and the brake position BP, the measurer 153 starts a timer corresponding to the range position and begins measurement of the residence time. When the position of the gear shift lever 141 as detected by the shift position sensor 142 is moved from the resident range position to another range position, the measurer 153 stops the timer corresponding to the resident range position. The measurer 153 starts a timer corresponding to the newly moved-to range position, and begins measurement of the residence time.

When the residence time measured by the measurer 153 is equal to or greater than the switching time for the range position where the gear shift lever 141 is resident, the switcher 154 switches the transmission range of the transmission 12 to the transmission range corresponding to the range position. The switching time for a range position is a time that serves as a threshold for determining whether the driver intends to switch to the transmission range corresponding to the range position, and is expressed as the time from when the gear shift lever 141 moves to a given range position until it is determined to switch to the transmission range corresponding to the range position. In other words, when the residence time is equal to or greater than the switching time, the switcher 154 determines to switch the transmission range, and executes the switch. The switching times for the range positions may be set to the same time or to different times. For example, the switching time for the neutral position NP is set to a longer time than the time of residence at the neutral position NP when the gear shift lever 141 is operated to the drive position DP or the reverse position RP and passes through the neutral position NP. This is done so that the transmission range is not once switched to the neutral range when switching the transmission range to the drive range or the reverse range. On the other hand, for range positions other than the neutral position NP, a very short time is set so that the transmission range is switched immediately in response to the gear shift lever 141 being operated.

The switcher 154 switches the transmission range of the transmission 12 by driving the actuator according to the transmission range to which the gear shift lever 141 is operated. For example, the switcher 154 drives the actuator to carry out the following control. For example, when the transmission range to which the gear shift lever 141 is operated is the drive range, the drive clutch is engaged and the reverse clutch is released. In the case of the reverse range, the drive clutch is released and the reverse clutch is engaged. In the case of the neutral range, the drive clutch and the reverse clutch are both released. In the case of the parking range, the drive clutch and the reverse clutch are both released, and the parking lock mechanism is activated.

The corrector 155 corrects the switching time for each range position. For example, if the transmission range is once switched to the neutral range when the transmission range is to be switched to the drive range or the reverse range, the corrector 155 corrects the switching time for the neutral position NP. The switching time for the neutral position NP is corrected based on the residence time of the gear shift lever 141 at the neutral position NP when the transmission range is switched to the neutral range when the transmission range is to be switched to the drive range or the reverse range. Accordingly, the corrector 155 corrects the switching time after completion of the measurement of the residence time, in other words, after the gear shift lever 141 is moved from the neutral position NP.

Correction Process 1

Figure 3:
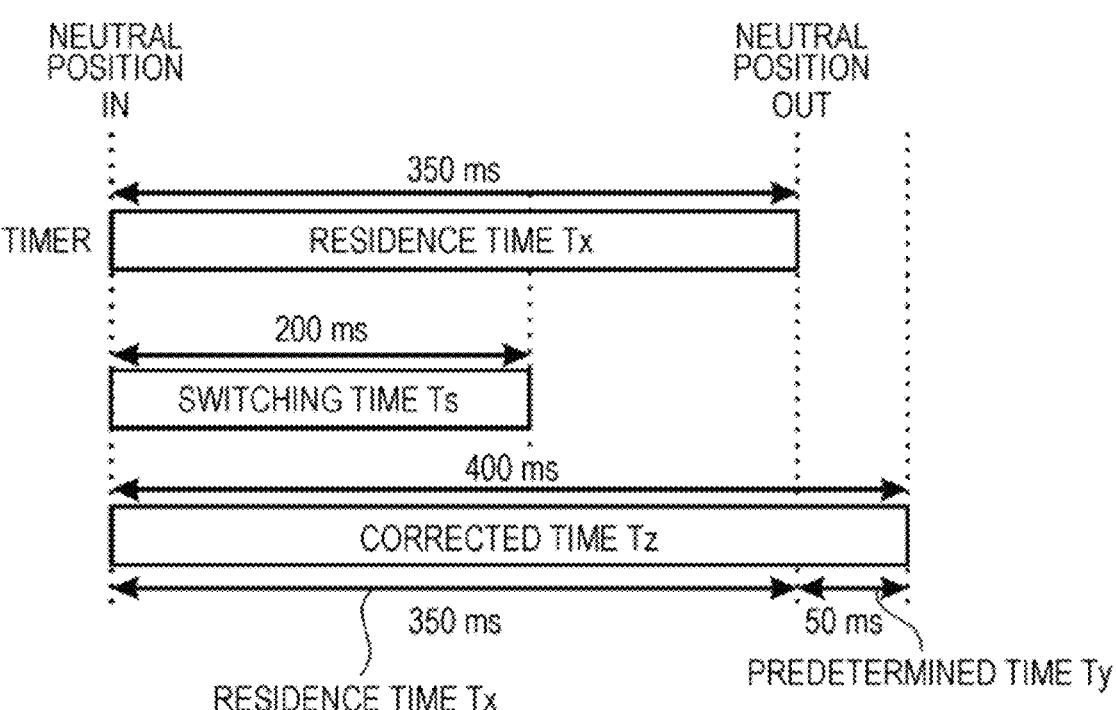
FIG. 3 is an explanatory diagram for explaining correction of switching time in a vehicle.

FIG. 3 is an explanatory diagram for explaining correction of the switching time in the vehicle 1. With reference to FIG. 3, correction of the switching time for the neutral position NP is explained.

As illustrated in FIG. 3, the residence time Tx is the time at the neutral position NP from when the gear shift lever 141 is moved to the neutral position NP (IN) until the gear shift lever 141 is moved toward another range position (OUT). If the residence time Tx is equal to or greater than a switching time Ts preset for the neutral position NP, the switching time Ts is corrected. For example, the corrector 155 corrects the switching time Ts to a corrected time Tz, which is the sum of the residence time Tx and a predetermined time Ty. If the preset switching time Ts is 200 ms, the residence time Tx is 350 ms, and the predetermined time Ty is 50 ms, then the corrected time Tz will be "350 ms+50 ms=400 ms".

Note that an upper limit may also be set for the corrected time Tz. In this case, if the sum of the residence time Tx and the predetermined time Ty is equal to or greater than the upper limit for corrected time Tz, the switching time Ts is corrected to the upper limit for the corrected time Tz. The predetermined time Ty may be 0.

Vehicle Behavior 1

Figure 4:
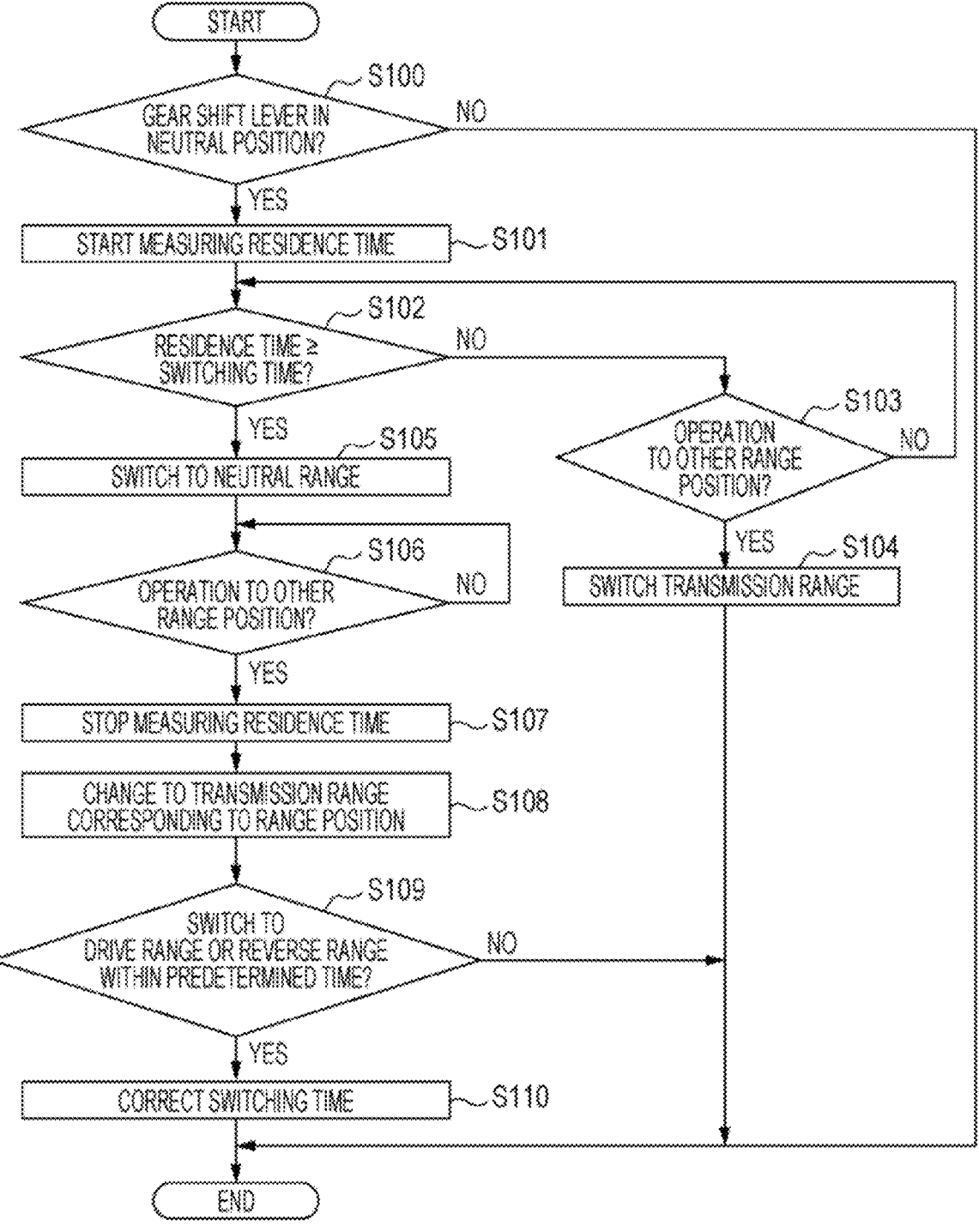
FIG. 4 is a flowchart illustrating a process for correcting switching time in a vehicle.

FIG. 4 is a flowchart illustrating a process for correcting the switching time Ts in the vehicle 1. FIG. 4 illustrates the flow of a correction process (hereinafter referred to as the "first correction process") for the case of correcting the switching time Ts to the corrected time Tz, which is the sum of the residence time Tx and the predetermined time Ty. The first correction process is executed every time the gear shift lever 141 is operated from the home position HP to another range position (brake position BP or neutral position NP).

As illustrated in FIG. 4, first, in step S100, the measurer 153 determines whether or not the gear shift lever 141 is operated to the neutral position NP. For example, the measurer 153 determines whether or not the gear shift lever 141 is operated to the neutral position NP by referring to a detection result regarding the position of the gear shift lever 141 received from the shift position sensor 142 of the range input device 14. As a result, if it is determined that the gear shift lever 141 is operated to the neutral position NP (YES in step S100), the process proceeds to step S101. Note that the process ends if it is determined that the gear shift lever 141 is not operated to the neutral position NP, that is, if it is determined that the gear shift lever 141 is operated to the brake position BP.

Next, in step S101, the measurer 153 begins measurement of the residence time Tx. For example, the measurer 153 has a timer that measures the time during which the gear shift lever 141 is resident at the neutral position NP. The measurer 153 starts the timer, and begins measurement of the residence time Tx.

Next, in step S102, the switcher 154 determines whether or not the residence time Tx measured by the measurer 153 is equal to or greater than the switching time Ts. The switching time Ts is a preset value, and is stored in the storage 152, for example. The switcher 154 compares the value measured by the timer of the measurer 153 with the switching time Ts to determine whether or not the residence time Tx is equal to or greater than the switching time Ts. As a result, if it is determined that the residence time Tx is not equal to or greater than the switching time Ts (NO in step S102), the process proceeds to step S103. Note that if it is determined that the residence time Tx is equal to or greater than the switching time Ts (YES in step S102), the process proceeds to step S105.

Next, in step S103, the switcher 154 determines whether or not the gear shift lever 141 is operated from the neutral position NP to another range position. For example, the switcher 154 determines whether or not the gear shift lever 141 is operated from the neutral position NP to the drive position DP or the reverse position RP by referring to a detection result regarding the position of the gear shift lever 141 received from the shift position sensor 142 of the range input device 14. If it is determined that the gear shift lever 141 is operated from the neutral position NP to the drive position DP or the reverse position RP (YES in step S103), the process proceeds to step S104. Note that if it is determined that the gear shift lever 141 is not operated to the drive position DP or the reverse position RP (NO in step S103), the process goes back to step S102.

Next, in step S104, the switcher 154 switches the transmission range to the drive range or the reverse range. Since the transmission range is switched to the drive range or the reverse range without being switched to the neutral range, correction of the switching time Ts is unnecessary. Consequently, the first correction process ends without correcting the switching time Ts.

If it is determined that the residence time Tx is equal to or greater than the switching time Ts (YES in step S102), in step S105, switcher 154 switches the transmission range of the transmission 12 to the neutral range.

Next, in step S106, the measurer 153 determines whether or not the gear shift lever 141 is operated from the neutral position NP to another range position. For example, the measurer 153 determines whether or not the gear shift lever 141 is operated from the neutral position NP to the home position HP, the drive position DP, or the reverse position RP by referring to a detection result regarding the position of the gear shift lever 141 received from the shift position sensor 142 of the range input device 14. If it is determined that the gear shift lever 141 is operated from the neutral position NP to the drive position DP or the reverse position RP (YES in step S106), the process proceeds to step S107. Note if it is determined that the gear shift lever 141 is not moved from the neutral position NP (NO in step S106), step S106 is repeated.

Next, in step S107, the measurer 153 ends measurement of the residence time Tx. For example, the measurer 153 stops the timer measuring the time of residence at the neutral position NP to end measurement of the residence time Tx. The measurer 153 stores the count value of the timer at the end of measurement as the residence time Tx in the storage 152.

Next, in step S108, the switcher 154 changes the transmission range to the transmission range corresponding to the range position to which the gear shift lever 141 is operated in step S106. For example, if the gear shift lever 141 is operated to the drive position DP or the reverse position RP in step S106, the switcher 154 switches the transmission range to the drive range or the reverse range, respectively. On the other hand, if the gear shift lever 141 is operated to the home position HP in step S106, the switcher 154 does not switch the transmission range, and the transmission range remains at the neutral range.

Next, in step S109, the corrector 155 determines whether or not the transmission range is switched to the drive range or the reverse range within a predetermined time (1.0 s, for example) after the transmission range is switched to the neutral range in step S105. If the transmission range is switched to the drive range or the reverse range within the predetermined time after being switched to the neutral range (YES in step S109), the process proceeds to S110. Note that if the transmission range is not switched to the drive range or the reverse range within the predetermined time after being switched to the neutral range (NO in step S109), the process ends without correcting the switching time Ts.

That is, the corrector 155 is configured not to correct the switching time Ts if the transmission range is switched to the neutral range to intentionally switch to the neutral range, or if the gear shift lever 141 is operated to the home position HP after the transmission range is switched to the neutral range. In other words, the switching time Ts is corrected in the case where the transmission range is unintentionally switched to the neutral range when the gear shift lever 141 is moved from the home position HP to pass through the neutral position NP to the drive position DP or the reverse position RP. As a result, the switching time Ts can be corrected to a more suitable time, making it possible to provide shift operations that feel comfortable to the driver.

Next, in step S110, the corrector 155 corrects the switching time Ts to the corrected time Tz, which is the sum of the residence time Tx and the predetermined time Ty as described above. The corrector 155 stores the corrected time Tz in the storage 152, and then ends the first correction process.

Correction Process 2

The foregoing embodiment is described by taking as an example the first correction process that corrects the switching time Ts based on the residence time Tx. However, the correction process is not limited to such an example and may be any of various correction processes. The following describes a second correction process that corrects the switching time Ts by a different process from the first correction process.

FIG. 5 is an explanatory diagram for explaining correction of the switching time in the vehicle 1. FIG. 5 is a table illustrating specific examples of residence times Tx during which the gear shift lever 141 is resident at the neutral position NP. In these examples, residence time Txn denotes the time during which the gear shift lever 141 is resident at the neutral position NP when the transmission range is to be switched to the drive range or the reverse range for the n-th time since the switching time Ts was corrected.

The second correction process corrects the switching time Ts if the transmission range of the transmission 12 is switched to the neutral range a number of times equal to or greater than a predetermined number of times when the transmission range is to be switched to the drive range or the reverse range. In this case, the shift by wire control device 15 is provided with a counter having an initial value of 0 to count the number of times the transmission range is switched to the neutral range when the transmission range is to be switched to the drive range or the reverse range. For example, when the value measured by the counter described above reaches N, the sum of the average residence time Ta or the maximum residence time Tmax and the predetermined time Ty is obtained as the corrected time Tz, where Ta is the average of the residence times Txn when the transmission range is switched to the neutral range, and Tmax is the maximum residence time Tx when the transmission range is switched to the neutral range.

The following describes an example in which the switching time Ts is corrected when the preset switching time Ts is 200 ms and the predetermined time Ty is 50 ms, and if the number of times that the transmission range is switched to the neutral range when the transmission range is to be switched to the drive range or the reverse range reaches three times.

As illustrated in FIG. 5, suppose that the number of times that the transmission range is switched to the neutral range when the transmission range is to be switched to the drive range or the reverse range reaches three times at the fifth switch to the drive range or the reverse range since the switching time Ts was corrected. Among the residence times Tx1 to Tx5, a switch to the neutral range occurred during the residence time Tx1, the residence time Tx4, and the residence time Tx5. In this case, the average residence time Ta is the average of the residence time Tx1, the residence time Tx4, and the residence time Tx5, namely "(210 ms30 320 ms+220 ms)/3=250 ms". Also, the maximum residence time Tmax is the greatest residence time of 320 ms from among the residence time Tx1, the residence time Tx4, and the residence time Tx5. Consequently, in the case of correcting the switching time Ts to the corrected time Tz defined as the sum of the average residence time Ta and the predetermined time Ty, the corrected time Tz will be "250 ms+50 ms=300 ms". In the case of correcting the switching time Ts to the corrected time Tz defined as the sum of the maximum residence time Tmax and the predetermined time Ty, the corrected time Tz will be "320 ms+50 ms=370 ms".

Note that also in the second correction process, an upper limit may be set for the corrected time Tz. In this case, if the sum of the residence time Tx and the predetermined time Ty is equal to or greater than the upper limit for the corrected time Tz, the switching time Ts is corrected to the upper limit for the corrected time Tz. Note that the predetermined time Ty may be 0.

Vehicle Behavior 2

Figure 6:
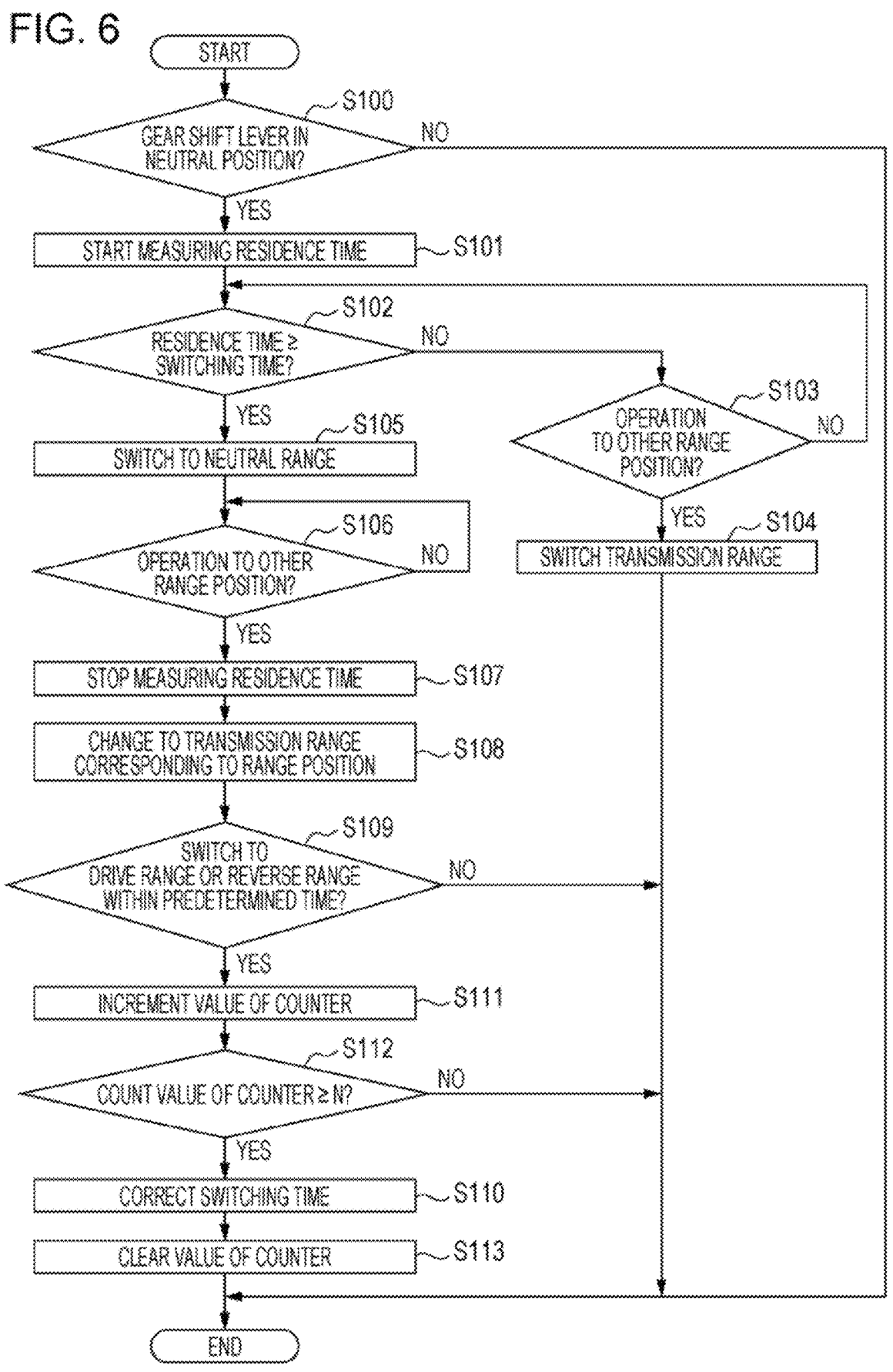
FIG. 6 is a flowchart illustrating a process for correcting switching time in a vehicle.

FIG. 6 is a flowchart illustrating a process for correcting the switching time Ts in the vehicle 1. FIG. 6 illustrates the flow of the second correction process described above. The second correction process is executed every time the gear shift lever 141 is operated from the home position HP to another range position (brake position BP or neutral position NP).

A comparison between FIG. 4 and FIG. 6 indicates that the second correction process includes the first correction process with the addition of steps S111, S112, and S113. Accordingly, to avoid redundancy, the following describes only steps S111, S112, and S113.

As illustrated in FIG. 6, step S111 is executed if it is determined that the gear shift lever 141 is operated directly from the neutral position NP to the drive position DP or the reverse position RP (YES in step S109). In step S111, the corrector 155 increments the value of the counter provided in the shift by wire control device 15.

Next, in step S112, the corrector 155 determines whether or not the count value of the counter incremented in step S111 is equal to or greater than N. If the count value of the counter is equal to or greater than N, the process proceeds to step S110. In step S110, as described with reference to FIG. 5, the switching time Ts is corrected to the corrected time Tz defined as the sum of the average residence time Ta and the predetermined time Ty, or to the corrected time Tz defined as the sum of the maximum residence time Tmax and the predetermined time Ty. Note that if the count value of the counter is less than N, the process ends.

Step S113 is executed after the processing to correct the switching time Ts in step S110. In step S113, the corrector 155 resets the count value of the counter to the initial value of 0.

As above, in the vehicle 1 according to the present embodiment, the first correction process or the second correction process is executed in the shift by wire control device 15 to correct the switching time Ts for the neutral position NP. In the first correction process, if the transmission range is unintentionally switched to the neutral range even once when the transmission range is intended to be switched to the drive range or the reverse range, the switching time Ts for the neutral position NP is corrected. Accordingly, even if the gear shift lever 141 is operated again with the same speed, the gear shift lever 141 is not unintentionally switched to the neutral range. This may allow the switching time Ts to immediately reflect how the driver tends to operate the gear shift lever 141.

On the other hand, in the second correction process, the switching time Ts is corrected if the transmission range is unintentionally switched to the neutral range N times when the transmission range is intended to be switched to the drive range or the reverse range. This may prevent unwanted correction of the switching time Ts when the driver accidentally operates the gear shift lever 141 more slowly than usual. Accordingly, a more suitable switching time Ts for the driver is set.

Consequently, the vehicle 1 according to the present embodiment can provide shift operations that feel comfortable to the driver as a result of executing the first correction process or the second correction process in the shift by wire control device 15.

The foregoing describes a suitable embodiment of the disclosure with reference to the accompanying drawings, but obviously the disclosure is not limited to the embodiment described above, and needless to say, various examples of changes or modifications within the scope of the claims also belong to the technical scope of the disclosure.

For instance, with reference to FIG. 2, an example is described above in which the brake position BP is located behind the home position HP, the neutral position NP is located to the right of the home position HP, and the reverse position RP is located in front of the neutral position NP. However, the arrangement of the range positions is not limited to the above. For example, the range positions may be arranged in any structure such as in a straight line in the front-rear direction, as long as the neutral position NP is passed through when the transmission range is to be switched to the drive range or the reverse range.

Further, as described above, an example of executing correction in the direction of lengthening the switching time Ts if the transmission range is once switched to the neutral range when the transmission range is to be switched to the drive range or the reverse range. However, if the driver becomes familiar with operating the gear shift lever 141 and faster at operating the gear shift lever 141, or if the driver is replaced by a driver who tends to operate the gear shift lever 141 quickly, the gear shift lever 141 needs to be held deliberately at the neutral position NP when the transmission range is to be switched to the neutral range. Accordingly, a correction to shorten and return to the switching time Ts may also be executed at different timing from the execution of the correction to lengthen the switching time Ts described above. Specific examples include a correction that sets the switching time Ts to a default value when an operation for resetting the switching time Ts is performed, a correction to shorten the switching time Ts so as to approach a default value with the passage of time since correction of the switching time Ts, and the like. This makes it possible to provide shift operations that feel comfortable to the driver even if the driver becomes faster at operating the gear shift lever 141.

The foregoing describes an example of simply storing the corrected switching time Ts in the storage 152. However, the corrected switching time Ts may be saved in association with driver identification information. The vehicle 1 starts moving after recognizing the driver and setting the switching time Ts corresponding to the driver. This makes it possible to set an optimal switching time Ts for each driver, and to provide shift operations that feel comfortable to the driver even if another driver drives the vehicle 1.

Note that in one embodiment of the disclosure, the drive range and the reverse range may serve as a first range. In one embodiment of the disclosure, the neutral range may serve as a second range. In one embodiment of the disclosure, the drive position DP and the reverse position RP may serve as a first range area. In one embodiment of the disclosure, the neutral position NP may serve as a second range area.

According to an embodiment of the disclosure, it is possible to provide shift range switching operations that feel comfortable to all drivers.

The shift by wire control device 15 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the shift by wire control device 15 including the measurer 153, the switcher 154, and the corrector 155. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle comprising:
a range input device comprising a gear shift lever and configured to accept an operation of the gear shift lever by a driver who drives a vehicle; and
a shift by wire control device configured to switch a transmission range of a transmission in response to the operation of the gear shift lever, wherein
the transmission range comprises a first range and a second range,
wherein the range input device comprises a first range area corresponding to the first range, a second range area corresponding to the second range, and a third area,
is configured to accept an operation by which the gear shift lever is moved to the first range area or an operation by which the gear shift lever is moved to the second range area, and
is structured such that the gear shift lever passes through the second range area when the gear shift lever is operated to the first range are from the third area, and
wherein the shift by wire control device comprises a processor and a storage storing a switching time and instructions causing the processor to:
in response to detection of a first movement of the gear shift lever from the third area to the second range area, measure a residence time during which the gear shift lever is resident at the second range area;
switch the transmission range to the second range when the residence time is equal to or greater than the stored switching time;
in response to an execution of switching the transmission range to the second range, determine whether a second movement of the gear shift lever from the second range area to the first range area is detected;
in response to determining that the second movement of the gear shift lever from the second range area to the first range area is detected, determine whether a first time is within a predetermined first threshold time, the first time being a time from when the switching to the second range of the transmission range is executed to the gear shift lever enters the first range area by the second movement;
in response to determining that the first time is within the predetermined first threshold time, execute a correction process including (i) calculating a corrected time obtained by adding a predetermined second time greater than zero to the residence time, (ii) updating the stored switching time to be equal to the calculated corrected time when the corrected time is less than a predetermined upper limit, and (iii) updating the stored switching time to be equal to the predetermined upper limit when the corrected time is equal to or greater than the predetermined upper limit; and
in response to determining that the first time is not within the predetermined first threshold time, skip the execution of the correction process.

2. A vehicle comprising:
a range input device comprising a gear shift lever and configured to accept an operation of the gear shift lever by a driver who drives a vehicle; and circuitry configured to switch a transmission range of a transmission in response to the operation of the gear shift lever, wherein the transmission range comprises a first range and a second range, the range input device comprises a first range area corresponding to the first range, a second range area corresponding to the second range, and a third area, is configured to accept an operation by which the gear shift lever is moved to the first range area or an operation by which the gear shift lever is moved to the second range area, and is structured such that the gear shift lever passes through the second range area when the gear shift lever is operated to the first range area from the third area, and the circuitry is configured to:

store a switching time;

in response to detection of a first movement of the gear shift lever from the third area to the second range area, measure a residence time during which the gear shift lever is resident at the second range area;

switch the transmission range to the second range when the residence time is equal to or greater than the stored switching time in response to an execution of switching the transmission range to the second range, determine whether a second movement of the gear shift lever from the second range area to the first range area is detected;

in response to determining that the second movement of the gear shift lever from the second range area to the first range area is detected, determine whether a first time is within a predetermined first threshold time, the first time being a time from when the switching to the second range of the transmission range is executed to the gear shift lever enters the first range area by the second movement;

in response to determining that the first time is within the predetermined first threshold time, execute a correction process including (i) calculating a corrected time obtained by adding a predetermined second time greater than zero to the residence time, (ii) updating the stored switching time to be equal to the calculated corrected time when the corrected time is less than a predetermined upper limit, and (iii) updating the stored switching time to be equal to the predetermined upper limit when the corrected time is equal to or greater than the predetermined upper limit; and in response to determining that the first time is not within the predetermined first threshold time, skip the execution of the correction process.

3. A vehicle comprising:

a range input device comprising a gear shift lever and configured to accept an operation of the gear shift lever by a driver who drives a vehicle; and a shift by wire control device configured to switch a transmission range of a transmission in response to the operation of the gear shift lever, wherein the transmission range comprises a first range and a second range, wherein the range input device comprises a first range area corresponding to the first range, a second range area corresponding to the second range, and a third area other than the first and second range areas, is configured to accept an operation by which the gear shift lever is moved to the first range area or an operation by which the gear shift lever is moved to the second range area, and is structured such that the gear shift lever passes through the second range area when the gear shift lever is operated to the first range area from the third area, and wherein the shift by wire control device comprises a processor and a storage storing a switching time and instructions causing the processor to:

in response to detection of a movement of the gear shift lever from the third area to the first range area, measure a residence time during which the gear shift lever is resident at the second range area;

switch the transmission range to the second range when the residence time is equal to or greater than the stored switching time;

count a number of occurrences of an event in which the movement satisfies conditions that (i) the residence time measured in the movement is equal to or greater than the stored switching time and (ii) the residence time measured in the movement is equal to or less than a predetermined time;

in response to the number of occurrences of the event being equal to or greater than a predetermined value greater than one, execute a correction process including (i) calculating a corrected time obtained by adding a predetermined time greater than zero to an average value or a maximum value of measured residence times in past events, (ii) updating the stored switching time to be equal to the calculated corrected time when the corrected time is less than a predetermined upper limit, and (iii) updating the stored switching time to be equal to the predetermined upper limit when the corrected time is equal to or greater than the predetermined upper limit; and in response to execution of the correction process, reset the counted number of occurrences of the event to zero.

4. The vehicle according to claim 1, wherein the first range is at least one of a drive range or a reverse range, and the second range is a neutral range.

5. The vehicle according to claim 2, wherein the first range is at least one of a drive range or a reverse range, and the second range is a neutral range.

6. The vehicle according to claim 3, wherein the first range is at least one of a drive range or a reverse range, and the second range is a neutral range.

7. The vehicle according to claim 1, wherein the processor is further configured to:

store the switching time in association with identification information of the driver of the vehicle; and rewrite, in the correction process, the switching time associated with the identification information of the driver of the vehicle.

8. The vehicle according to claim 2, wherein the circuitry is further configured to:

store the switching time in association with identification information of the driver of the vehicle; and rewrite, in the correction process, the switching time associated with the identification information of the driver of the vehicle.

9. The vehicle according to claim 3, wherein the processor is further configured to:

store the switching time in association with identification information of the driver of the vehicle; and rewrite, in the correction process, the switching time associated with the identification information of the driver of the vehicle.

* * * * *